Oct. 7, 1958 H. V. ANTRANIKIAN 2,855,455

SIGNALLING SYSTEMS

Filed July 27, 1953 2 Sheets-Sheet 1

INVENTOR

Haig V. Antranikian

Oct. 7, 1958 H. V. ANTRANIKIAN 2,855,455

SIGNALLING SYSTEMS

Filed July 27, 1953 2 Sheets-Sheet 2

INVENTOR

Haig V. Antranikian

United States Patent Office 2,855,455

Patented Oct. 7, 1958

2,855,455

SIGNALLING SYSTEMS

Haig V. Antranikian, Jackson Township, N. J.

Application July 27, 1953, Serial No. 370,378

5 Claims. (Cl. 178—5.4)

The invention relates to improvements to signalling systems suitable for the transmission of color television, or the like.

In a pending application, Serial No. 306,826, filed August 28, 1952, now abandoned, of which the present application is a continuation in part, means and processes are disclosed for packing, or collecting the information content of a signal potential, having a given spectrum, within a reduced spectrum; this is accomplished by transferring the information content of a lower part of the spectrum into a higher part of the same, using the heterodyne principle; in the present application a further improvement is made by which the converse operation can also be made. As a consequence, a complete spectrum can be divided into several fractions and the information content of the complete spectrum can be collected within any preassigned fraction of the same, whether the latter is a higher or lower fraction. The invention can be applied to the formation of signals for the transmission of color television with a channel bandwidth not exceeding that of monochrome television as practised today; moreover, the signals in accordance with the invention carry more information per color than in the systems heretofore proposed and no not involve any "subcarrier" requiring very difficult and generally unstable synchronization.

Consequently, one object of the invention is the transfer of the information content of a higher fraction of a spectrum into a lower fraction of the same, and also the collection of the information content of both fractions of the spectrum within the said lower fraction.

Another object of the invention is the subdivision of several separate spectra-which may overlap each other and which may correspond to video signals for several colors—into fractional spectra, the preassigning of mutually exclusive (substantially nonoverlapping) fractional spectra each for one of said separate spectra, and the collecting of the information content of each of the separate spectra within its preassigned fractional spectrum.

Other objects of the invention will appear in the following specifications and the appended claims.

The invention is illustrated by the accompanying drawings, in which.

In the figures of apparati in block diagram form, where a filter is shown the reference in parentheses corresponds to that of the related explanatory diagram and indicates the fraction of spectrum to the frequencies of which the filter leaves passage.

Figure 1:
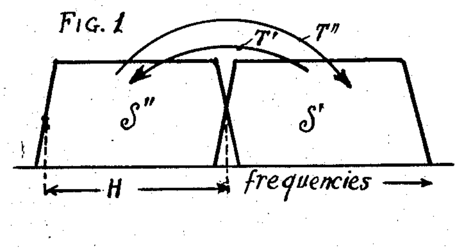
Figure 1 is a diagram for explaining the principle of the invention and Figure 2 shows an apparatus in block diagram form for carrying into effect that principle.

Figure 1 shows the spectrum of a signal potential divided into two fractional spectra S′ and S″, which have been assumed to have the same bandwidth for simplicity, but this is not a necessary requirement of the invention. As explained in the aforesaid copending patent application, the component frequencies of the signal potential corresponding to the lower fraction S″ of the spectrum can be transferred (shifted) into the higher fraction S′ by dissecting that signal potential and by passing the dissected signal potential through a filter admitting only the frequencies within the higher fraction S′ of the spectrum. (By "dissecting" is meant, of course, as in the aforesaid copending application, an operation of chopping, modulating, heterodyning or the like by which the component frequencies of a given signal are transferred from one spectrum into another spectrum without altering substantially the relative amplitudes of the component frequencies. These operations differ only slightly from one another and do not alter substantially the information content of a signal; the word dissecting is used here for brevity of language as the means for transfer is indifferent to the invention.) This transfer is symbolized by the curved arrow T″, and all the transfers are symbolized in this way in the drawings. Then by adding (mixing) the part of the signal potential transferred to the fraction S′ of the spectrum to the part of the signal potential originally corresponding to the latter spectrum a single modified signal potential is formed having all its component frequencies within this same higher fraction of the spectrum but containing substantially the information in both fractional spectra S′ and S″. In other words, by this method the information content of the full spectrum, comprising both S′ and S″, has been collected within the higher fraction S′ of the full spectrum, thus reducing the bandwidth of the full signal potential without substantial loss of information.

The operation of transfer just described is based on the fact that when the partial signal potential corresponding to the fraction S″ of the spectrum is dissected at a given frequency H, the resulting signal contains in a higher sideband the component frequencies F″+H, where F″ is any component frequency within the spectrum S″, which fall within the spectrum S and have practically the same envelope of amplitudes as that formed by the frequencies F″, that is, they contain substantially the same information as the signal potential corresponding to the fraction S″ of the spectrum.

Figure 2:
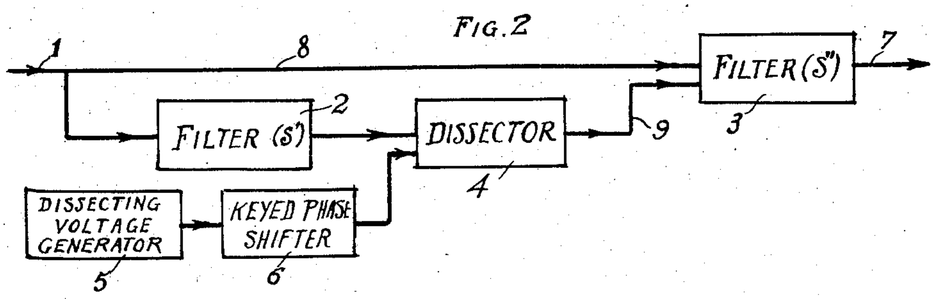

The present invention takes advantage from the fact that a dissected signal potential has also a lower sideband which carries substantially the same information as the higher sideband; this fact makes possible the transfer of the information content of a higher fraction of a spectrum, such as S′, into a lower fraction of the same, such as S″, as symbolized by the arrow T′; this operation is the converse of the one symbolized by the arrow T″ and may be performed by the apparatus shown in block diagram form in Figure 2 (this apparatus is similar to one described in the aforesaid copending application for a transfer such as symbolized by the arrow T″, the only difference being an interchange of filters). The full signal potential is connected to the two filters 2 and 3 which let pass, respectively, the frequencies within the fraction S′ of the full spectrum and the fraction S″ of the same. The partial signal potential passing through the filter 2 is dissected at 4 by a dissecting voltage generated at 5 and periodically shifted at 6 in phase; the function of this shift will be explained later; the frequency of the dissecting voltage is chosen to produce component frequencies which fall within the fraction S″ of the spectrum; in the instance illustrated it may be equal to H (as S′ and S″ have the same bandwidth) and in general it may be equal to the mean distance of the two fractional spectra. The output 9 of the dissector 4, which includes the lower sideband frequencies F′−H, where F′ is any component frequency of the original signal potential comprised in the fractional spectrum S′; these lower sideband frequencies fall within the fraction S″ of the spectrum. The output 9 is then connected to the filter 3. The output 7 of the filter 3 comprises only component frequencies within the lower fraction S″ of the spectrum but nevertheless contains the information corresponding to both fractional spectrum S′ (through the connection 9 to the dissector) and to the fractional spectrum S″ (through the direct connection 8 to the full signal potential at 1).

It is readily seen that the filter 3 functions as an adder as well as a filter, which means that the filtering and adding means may be often the same, and should be understood thus in the appended claims. If desired, a buffer, such as amplifier tube (not shown) may be inserted in the connection 8 in order to avoid a feedback from the output 9 of the dissector to the input 1.

When there are only two fractional spectra as in Figure 1 and the signal potential is the video output of a television camera, the frequency of dissection is preferably made equal to an odd multiple of one half the line sweep frequency. This is because the energy of the original video signal is usually bunched around frequencies which are multiples of the line sweep frequency; with the preferred frequency mentioned the energy of the dissected part of the signal potential will be bunched around frequencies which are between the frequencies of the original video signal, thus minimizing the interferences between the dissected and the undissected signals; however, when the full spectrum is divided in more than two fractional spectra other frequencies may be more advantageous as set forth later.

In the aforesaid patent application it is explained that a keyed phase shifter as shown at 6 (Figure 2) is mainly useful when the signal potential at 1 is a video signal corresponding to one color in a color television system; the dissected part of the video signal is likely to appear discontinuous on the screen of the receiver, even when the video signal before dissection is continuous, since the dissecting operation cuts the signal at regular intervals; when the phase of the dissecting voltage is shifted cyclically, however, the discontinuities shift also in position on the screen and the average illumination only will appear to the eye if the shift is made at a sufficient frequency. The shifting of phase may be keyed, for instance, to the field or frame frequency of the picture; then a shift of 180 degrees may be made at every field or frame; another shift which may give a good result is a cyclical shift of 0, 240, 120 degrees (in that order) in successive fields; the staggered amounts of the shifts may suppress an apparent horizontal "crawl."

These shifts produce the desired effect particularly well when the dissecting frequency is an integral multiple of the line scan frequency; however the invention is not limited to that case.

For brevity of language in the following disclosure the expression "transfer—upward or downward—of a fractional spectrum into another fractional spectrum" will be used, and symbolized by curved arrows such as T″ (upward) or T′ (downward), for the operation of dissecting the partial signal potential corresponding to the first fractional spectrum and then filtering it so that only the component frequencies comprised within the second fractional spectrum remain. Also the expression "transfer of the information content of a first fractional spectrum into another fractional spectrum" will be used for the same operation.

Figure 3:
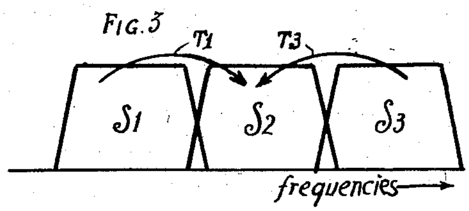
Figures 3 and 4 are respectively a diagram and an apparatus illustrating the case where a full spectrum is divided in more than two parts and the information content of the full spectrum is collected within a middle fraction of the same spectrum.
Figure 4:
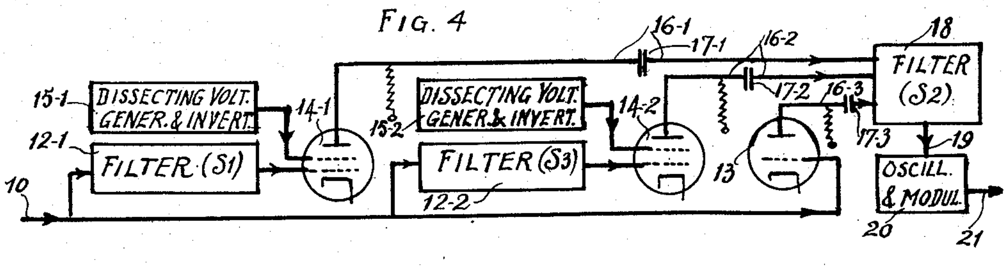

Figures 3 and 4 illustrate an application of the method and apparatus described above and in the aforesaid application for considerably reducing the bandwidth of the spectrum of a signal potential without substantial loss of the information content of the original signal potential. In the example illustrated by these figures the full spectrum of a signal potential is divided into three fractional spectra S1, S2, S3 and it is proposed to transfer the two end fractional spectra, S1 and S3, into the middle fractional spectrum S2, as symbolized by the arrows T1 and T3; it is further proposed to add the signal potentials corresponding to the transferred spectra to the partial signal potential originally corresponding to the fractional spectrum S2 and to use the added signal potentials for modulating a carrier radio frequency potential.

The apparatus for carrying out the above purposes is shown in Figure 4 in block diagram form except for a few circuits drawn more explicitly. The signal potential at 10, which carries the full information corresponding to all three spectra S1, S2, S3, is connected to filters 12–1 and 12–2, which separate respectively the component frequencies within the spectra S1 and S3, and also to the grid of the tube 13, which serves as a buffer. The outputs of the filters 12–1 and 12–2 are connected respectively to first control grids of tubes 14–1 and 14–2, on the other hand, dissecting voltages are provided by generators 15–1 and 15–2; the frequencies of these voltages, which will be denoted H1 and H2, may be for any effective operation equal to the mean distances of the spectra S1—S2 and S3—S2, respectively; other aspects of these voltages will be mentioned later. The outputs of the generators 15–1 and 15–2 are connected to second control grids of tubes 14–1 and 14–2. It is readily understood that the latter tubes, when properly biased (as a class B amplifier, for instance), operate as dissectors of the inputs from the filters 12–1 and 12–2. The output of tube 14–1 carries, therefore, at 16–1 component frequencies (F1+H1) and (F1−H1) in two sidebands, F1 designating any frequency within the fraction S1 of the full spectrum; with the choice of the frequency H1 stated above the component frequencies (F1+H1) fall within the fractional spectrum S2. Likewise, the output of tube 14–2 carries at 16–2 the component frequencies (F3+H3) and (F3−H3) in two sidebands, F3 being any frequency within the fractional spectrum S3 and the component frequencies (F3−H3) fall within the fractional spectrum S2. As is well known, each sideband of a dissected signal potential carries substantially the same information as the signal potential before dissection and one of them may be suppressed without substantial loss of information; this means that the sidebands with frequencies (F1+H1) and (F3−H3), both of which fall within the fraction S2, of the spectrum contain substantially the informations within the fractions S1 and S3 of the same spectrum. The outputs 16–1 and 16–2 are connected through condensers 17–1 and 17–2 to the filter 18 which leaves passage to the sideband component frequencies which fall within the spectrum S2 and eliminates the other frequencies; hence the output 19 of that filter will carry the informations corresponding to both the fractional spectra S1 and S3 but is made up only of component frequencies comprised within the fractional spectrum S2. On the other hand, since the output of the buffer tube 13 is also connected to the filter 18, the output 19 will comprise also the information originally contained in the part of the signal potential at 10 which corresponds to the fractional spectrum S2; thus the output 19, although composed of frequencies within the fraction S2 of the spectrum, will contain substantially the full information corresponding to the three spectra S1, S2, S3.

The output 19 of the filter 18 may be used for modulating a radio frequency potential with conventional means as represented by the block 20; the modulation may be made to have single sideband; in this case the output 21 of the modulator 20 will have the same bandwidth as the fractional spectrum S2 although carrying the information content of the three fractional spectra S1, S2, S3.

When the apparatus of Figure 4 is used for the transmission of a video signal the dissecting voltages produced by the generators at 15–1 and 15–2 are preferably shifted in phase cyclically, for the reasons given above in connection with the apparatus of Figure 2. The voltages may be, for instance, inverted (shifted 180 degrees) at every field or frame scanned; or they may be shifted, as already suggested above, 0, 240 and 120 degrees in successive fields. Also other shifts may be used or they may be omitted altogether.

For the same use of the apparatus, as there are two dissected partial signal potentials and one undissected partial signal potential and since the latter has component frequencies bunched around multiples of the line sweep frequency, the interference between the three inputs to filter 18 will be minimized when the dissected signal potentials have component frequencies mainly bunched around frequencies which are not multiples of the line sweep frequency; it will further be advantageous to not bunch the two dissected potentials around the same frequencies; this aim is attained when the dissecting frequencies H1 and H3 are respectively equal to $(m+1/3)$ times and $(n+2/3)$ times the line sweep frequency, $m$ and $n$ being two integers; these integers are chosen of course so that the frequencies H1 and H3 satisfy the conditions for an efficient transfer of fractional spectra S1 and S3 into the fractional spectrum S2, as set forth above.

Figure 4 shows two separate dissecting voltage generators; this may be needed in general but in many cases the same frequency of dissection, and therefore the same generator, may be used for both the outputs of filters 12–1 and 12–2. This is the case, for instance, when the fractional spectrum S2 is larger than the two other fractional spectra: a single frequency of dissection equal to the bandwidth of S2 may be used.

For brevity of language, the operation by which the partial signal potential corresponding to one or more fractional spectra are dissected and transferred into a preassigned fraction of the spectrum (not overlapping said one or more fractional spectra) and then added to the original partial signal potential corresponding to the preassigned fraction of the spectrum, this operation will be expressed by the prhase "collecting the information content of the complete (or full) spectrum (that is, of all the fractional spectra considered) within the preassigned fractional spectrum."

As already explained, the diagram of Figure 3 is related to the case where the information content of the complete spectrum is collected within the preassigned fraction S2 of the same spectrum. If desired, however, the information content of the complete spectrum may be collected within the lower fraction of the spectrum, S1, as shown diagrammatically in Figure 5($a$); in this case the spectra S2 and S3 are both transferred downward into the preassigned fractional spectrum S1, as symbolized by the arrows T2′ and T3′, and then the partial signal potentials corresponding to the transferred spectra are added to the partial signal potential corresponding to the preassigned fraction S1. The apparatus for performing this collection is the same as that shown in Figure 4, already described, except that the descriptions of the filters 12–1 and 18 are exchanged and that, of course, the frequencies of the dissecting voltages are chosen to produce sidebands falling within the preassigned fractional spectrum S1; these frequencies may be, for instance, equal to the mean distance between the spectra S1 and S3 (generator 15–1) and to the mean distance between the spectra S1 and S3 (generator 15–2).

The same operation may be performed, however, by first collecting the information content of both spectra S2 and S3 within the fractional spectrum S2, using an apparatus similar to that described in connection with Figure 2, and then again collecting the information thus gathered into the spectrum S2 and the information originally contained in the preassigned fractional spectrum S1 within the latter spectrum; the transfers for this performance are indicated by the interrupted-line arrows $ta$.

Figure 5:
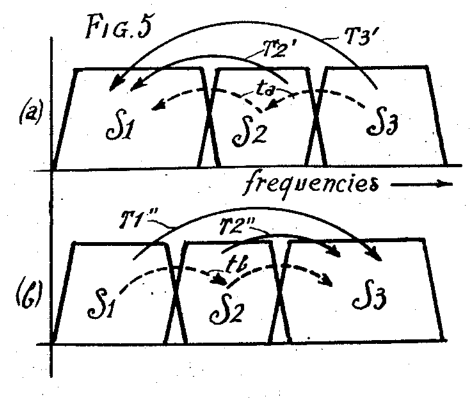
Figure 5 shows diagrams similar to that of Figure 3 but corresponding to the case where the information content of the full spectrum is collected within a lower or higher fraction of the spectrum.

In a similar way, the preassigned fractional spectrum for collection may be the highest fraction S3 of the complete spectrum; the transfers in this case are symbolized by the arrows T1″ and T2″ (Figure 5($b$)). The collection of this type can again be performed by an apparatus similar to that of Figure 4 with these differences: the filter 12–2 leaves passage to the frequencies of the fractional spectrum S1 and the filter 18 leaves passage to the frequencies within the fractional spectrum S3, and the generators 15–1 and 15–2 produce dissecting voltages at frequencies respectively equal to the mean distances of the pairs of spectra S1—S3 and S2—S3.

The collection of the information of the complete spectrum within the spectrum S3 may also be made by first collecting the information content of the two fractional spectra S1 and S2 within the latter spectrum and then collecting within the preassigned spectrum S3 the first collected information and the original information content of the preassigned spectrum; the transfers for this operation are symbolized by the interrupted-line arrows $tb$ (Figure 5($b$)). The operation may be performed by two successive apparati similar to that of Figure 2.

Figure 6:
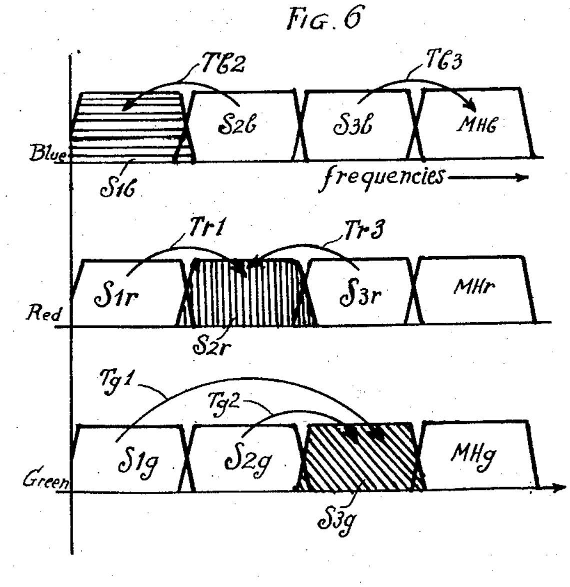
Figure 6 is a diagram and Figure 7 shows an apparatus in block diagram form for applying the principle of the invention to a color television signalling system.
Figure 7:
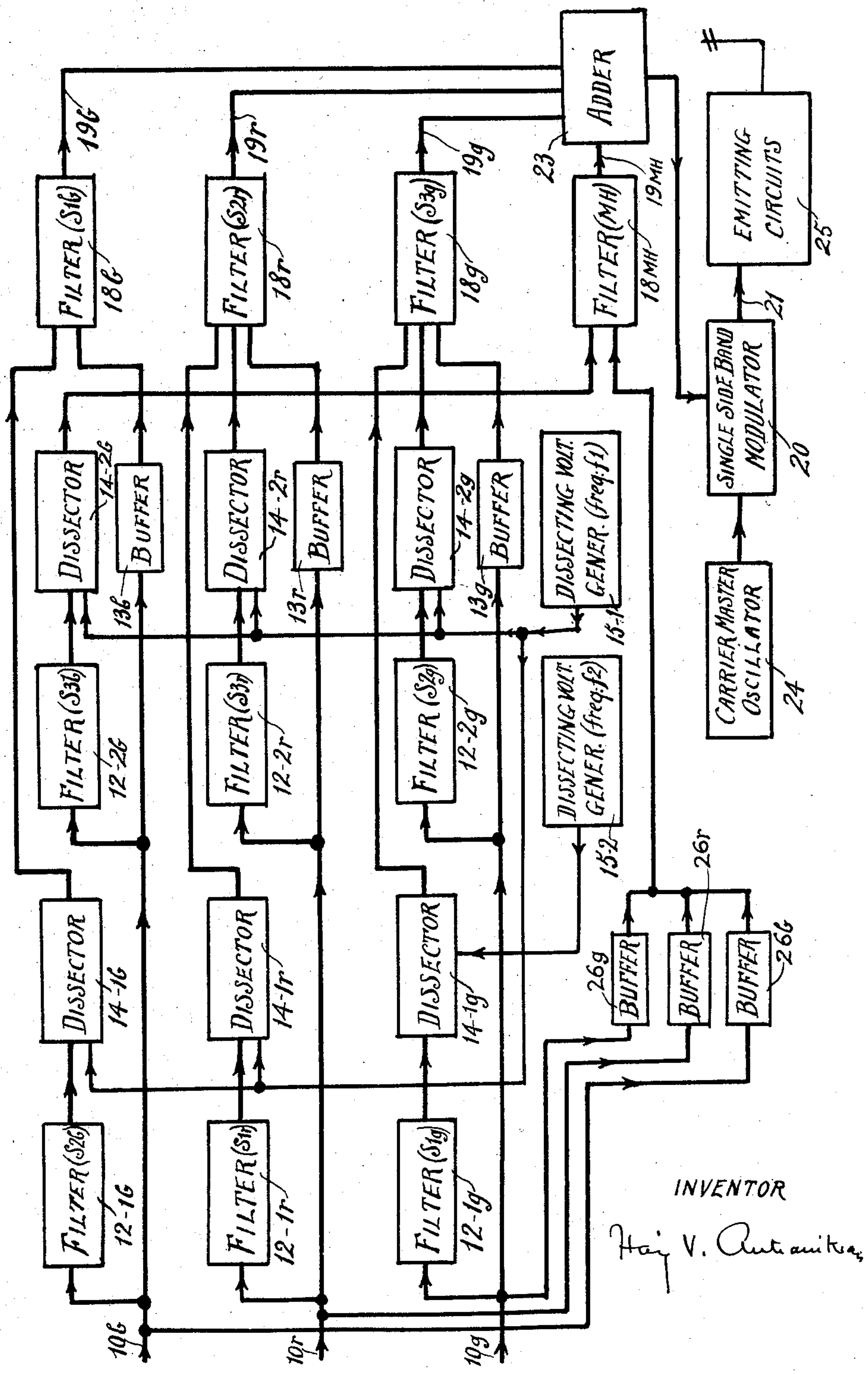

Figures 6 and 7 illustrate an application of the invention to color television; it is aimed at the formation of a radio frequency carrier video signal having an overall bandwidth not exceeding that of a monochrome television carrier video signal but, nevertheless, carrying in four adjacent separate channels of the same carrier the information contents of three complete spectra for three primary colors three channels being used for three "color components" and a separate channel being used for a "brightness component."

For simplicity of language it will be assumed that the primary colors are the blue, the red and the green, being understood that any other colors or combination of colors may be substituted to them without departing from the invention.

In the example ilustrated it has been assumed that the full spectra of the video signals for the three colors (outputs of a color television camera) have the same bandwidths and that they are subdivided in equal fractional spectra, Viz.: S1$b$, S2$b$, S3$b$, MH$b$ for the blue color, S1$r$, S2$r$, S3$r$, MH$r$ for the red color and S1$g$, S2$g$, S3$g$, MH$g$ for the green color. It has been further assumed that the information content of both spectra S1$b$ and S2$b$ shall be collected within the preassigned fraction S1$b$ of the full spectrum (shaded) while the information content of the two fractional spectra S3$b$ and MH$b$ shall be collected in the latter; these operations are made through transfers symbolized by the arrows T$b$2 and T$b$3. Likewise, it has been assumed that the information content of the complete spectrum formed by the fractional spectra S1$r$, S2$r$, S3$r$ shall be collected within the preassigned fractional spectraum S2$r$ (shaded) and that the information content of the complete spectrum formed by the fractional spectra S1$g$, S2$g$, S3$g$ shall be collected in the latter preassigned spectrum (shaded). Finally it has been assumed that the information contents of the fractional spectra MH$b$ (including the information transferred from the fractional spectrum S3$b$), MH$r$, and MH$g$ shall be added to form a "mixed highs" (brightness) signal.

Figure 7 shows in block diagram form an apparatus for carrying out the operations just outlined. It is in the main composed of three devices similar to that of Figure 4, already described; consequently a brief description will suffice. The reference numbers in Figure 7 correspond to those of Figure 4 whenever they are the same.

The video signal for the blue color at 10$b$ (derived from a color television camera, not shown) is connected to the two filters 12–1$b$ and 12–2$b$ and also to the two filters 18$b$ and 18MH through the buffers 13$b$ and 26$b$; these buffers serve the purpose of preventing the occurrence of feedbacks from other circuits and may simply consist of an electron tube as shown at 13 of Figure 4. The outputs of the filters 12–1*b* and 12–2*b* are dissected at 14–1*b* and 14–2*b*, respectively, both at the same frequency *f*1 by a voltage supplied by the generator 15–1, the frequency *f*1 being equal, for instance, to the common bandwidth of the fractional spectra. The output of the dissector 14–1*b*, which contains a lower side band of frequencies within the fractional spectrum S1, is connected to the filter 18*b*; it is then clear that the output 19*b* of the latter, although limited in frequencies to those within the fractional spectrum S1*b*, will contain substantially all the information of the blue color video signal at 10*b* having component frequencies from zero to the end frequency of the fractional spectrum S2*b*. On the other hand, the output of the dissector 14–2*b* is connected to the filter 18MH which selects the sideband frequencies of the partial video signal dissected at 14–2*b* comprised within the fractional spectrum MH*b*; consequently the output 19MH of the filter 18MH will include the information content of the fractional spectrum S3*b*. The connections of the outputs at 19*b* and 19MH will be considered later.

Next, taking up the video signal for the red color at 10*r*, it is directly connected to the filters 12–1*r* and 12–2*r* (leaving passage to the frequencies within the fractional spectra S1*r* and S3*r*) while it is connected to the filters 18*r* and 18MH through the buffers 13–*r* and 26–*r*, respectively. The outputs of the filters 12–1*r* and 12–2*r* are dissected by the dissectors 14–1*r* and 14–2*r* respectively at a frequency *f*1, already defined above, and the outputs of both dissectors are connected to the filter 18*r*; the latter leaves passage only to frequencies within the fractional spectrum S2*r*. With the explanations already given above, it will be understood that, at the output 19*r*, substantially the full information content of the red video signal corresponding to all three fractional spectra S1*r*, S2*r*, S3*r* is collected within the preassigned fractional spectrum S2*r*, and that the output 19MH of the filter 18MH will include the information for the red color corresponding to the fractional spectrum MH*r*. The subsequent connections of these outputs will be considered later.

Considering finally the video signal for the green color at 10*g*, it is connected directly to the filters 12–1*g* and 12–2*g* and, through buffers 13*g* and 26*g*, to the filters 18*g* and 18MH; the output of the filter 12–2*g* is connected to the dissector 14–2*g* where it is dissected at a frequency *f*1 (already defined) by a voltage generated at 15–1; likewise, the output of the filter 12–1*g* is dissected at 14–1*g* by a voltage generated at 15–2 and having a frequency *f*2; the latter may be equal to about twice the frequency *f*1. As a result the outputs of both dissectors will include sideband frequencies falling within the fractional spectrum S3*g* and will carry the information content of the fractional spectra S1*g* and S2*g*. These outputs are connected to the filter 18*g*; as the latter leaves passage to frequencies within the fractional spectrum S3*g* only, it is clear that the output 19*g* of the filter will include the information contents of the three fractional spectra S1*g*, S2*g*, S3*g* collected within the fractional spectrum S3*g*. It is also clear from the connections made to the filter 18MH that its output 19MH will include the information contents of the fractional spectra S3*b* (transferred to the fractional spectrum MH*b*), MH*b*, MH*r* and MH*g*.

The outputs 19*b*, 19*r*, 19*g* and 19MH are all added at 23; the output of the adder 23 will thus carry in four separate spectra, with a total bandwidth not exceeding the full spectrum corresponding to the video signal for a single color, substantially the full information contents of all the video signals at 10*b*, 10*r*, 10*g*; three of the separate spectra carry informations for unmixed colors and the fourth separate spectrum (corresponding to the output 19MH) carries the information of a mixed color video signal comprising the upper component frequencies of the video signals for the three colors.

The output of the adder 23 may be used for modulating (at 20) a carrier radio frequency voltage generated at 24; the modulation is preferably of the type producing a single sideband. It follows from the description given above of the output of the adder 23 that the modulated output 21 will carry (at radio frequencies) in four separate channels the information content of three separate video signals corresponding to pure primary colors and a partial video signal corresponding to a mixed hue of the same colors.

The radio frequency signal 21 can be emitted through conventional emitting circuits 25. It will be readily understood by persons familiar with the art that the signal thus emitted can be used for producing color pictures in a color television receiver.

As explained above with reference to Figure 4, the dissecting voltages *f*1 and *f*2 may be shifted in phase cyclically in order to eliminate discontinuities in the received picture; in this case, phase shifting devices (which are well known) are included in the voltage generators 15–1 and 15–2. The preferred shifts are either an inversion (180 degrees shift) at every frame or three cyclical shifts of 0, 240, 120 degrees at the rate of one shift to every field scanned.

Also, for reasons given above, it is preferred that the dissecting frequencies *f*1 and *f*2 be multiples non-divisible by three of one third the line sweep frequency of the picture, that is, if the latter frequency is denoted by $h$, then one of the frequencies *f*1 or *f*2 is preferably equal to $(m+1/3)h$ and the other equal to $(n+2/3)h$, $m$ and $n$ being integers.

Figure 6 shows only one of the many possible ways in which the spectra corresponding to the video signals for a number of colors can be subdivided and the informations collected within a multiplicity of preassigned non-overlapping fractional spectra. With the methods and apparati described above and in the aforesaid pending patent application any type of subdivision of the spectra in question and subsequent collections of information may be accomplished. For instance, the bandwidths of the subdivided fractional spectra need not be equal either for the same color or for the different colors. Also, the fractional spectrum S3*b* can be transferred into the spectrum S1*b*, instead of into MH*b*. Another instance is the collecting within the fractional spectra bearing the reference letters MH of the informations in all the fractional spectra S2*b*, S3*b*, S3*r*, instead of the spectrum S3*b* alone. Still another instance is the omission of the brightness component altogether, in which case the fractional spectra MH*b*, MH*r*, MH*g* are omitted and the fractional spectra for each color may be extended to occupy the full bandwidth allowed for the emission of television signals, etc.

All these instances can be carried into effect by the apparati described and illustrated in the drawings of the present application and in the aforesaid application Ser. No. 306,826; they require only the proper choice of filters and dissecting frequencies, and other minor changes which will be obvious to persons skilled in the art. It may be added that the preferred dissecting frequencies mentioned above (which are multiples non divisible by three of one third the line sweep frequency) can be obtained by deriving the dissecting voltages from the synchronization signal generator of a television camera by known circuits for dividing and multiplying frequencies.

Also, if desired, switchings can be made between the video signals for different colors and the preassigned fractions of spectra in which these signals are collected, as described already in the aforesaid pending application; that is, instead of connecting the points 10*b*, 10*r*, 10*g* directly to the outputs of a color television camera (not shown), they may be connected to the latter outputs through a switching system which changes cyclically these connections. Or, two color video signals may be transmitted at a time by omitting, for instance, the input point 10*g* and the parts connected to it up to 18*g*, exclusively, and then the two points 10*b* and 10*r* may be connected cyclically to the three output of the camera; etc. There are well known means for these switchings, electronic as well as mechanical, and need not be described here.

It must be understood, of course, that in the apparati shown (Figures 2, 4, 7) and described only the parts needed for the performance of the operations mentioned are represented. The insertion of parts currently used in apparati of the type described, such as amplifiers, auxiliary networks, D. C. restorers, means for adjusting the relative powers of inputs or outputs for the three colors, etc., do not constitute a departure from the invention.

What I claim is:

1. An apparatus for transmitting a signal having a given spectrum of frequencies through a reduced range of frequencies, having in combination: filtering means for separating from the said signal the component frequencies comprised within a predetermined fraction of the spectrum; means for transferring the component frequencies of the signal not comprised within said fraction of the spectrum into the same fraction of the spectrum; means for adding the entire transferred signal with the partial signal originally in said fraction of the spectrum and separated by said filtering means; and means for transmitting the added signals unmixed with other signals.

2. The apparatus of claim 1 in which said signal having a given spectrum is a video signal from a television camera having a line scan and a field scan frequency and in which said means for transferring comprises a means for dissecting at a frequency which is an integral multiple of said line scan frequency and the phase of which is inverted in timed relation with said field scan frequency.

3. An apparatus for the transmission through non-overlapping and reduced channels a number of signals having overlapping spectra of frequencies, comprising in combination: filtering means for separating from each of said number of signals a predetermined range of frequencies comprised within a fraction of its own spectrum, the different fractions of spectra corresponding to different signals being distinct and substantially non-overlapping; means for transferring the component frequencies of each of said signals which are not comprised within its predetermined range of frequencies to component frequencies which are within the same said predetermined range of frequencies; means connected with said filtering means and said transferring means for adding within each signal the separated part of the signal to the complete transferred part of the signal, thus producing a number of modified signals each corresponding to one of said number of signals and having component frequencies within their respective non-overlapping fractions of their spectra; and means for transmitting said modified signals through mutually exclusive and substantially non-overlapping channels.

4. The apparatus of claim 3 in which said means for transmitting comprises a means for generating a radio frequency carrier signal, a means for modulating the carrier signal simultaneously with all the said modified signals, and a means for emitting the modulated signals.

5. The apparatus of claim 3 in which said number of signals are color video signals from a color television camera having a line scan and a field scan frequency and in which said means for transferring comprise means for dissecting the parts of the signals to be transferred at frequencies which are integral multiples of said line frequency and the phases of which are inverted in timed relation with said field scan frequency.

References Cited in the file of this patent

UNITED STATES PATENTS

| | | |
|---|---|---|
| 2,627,549 | Kell | Feb. 3, 1953 |
| 2,634,324 | Bedford | Apr. 7, 1953 |
| 2,635,140 | Dome | Apr. 14, 1953 |
| 2,644,030 | Moore | June 30, 1953 |
| 2,657,253 | Bedford | Oct. 27, 1953 |
| 2,666,806 | Kalfaian | Jan. 19, 1954 |
| 2,736,762 | Kell | Feb. 28, 1956 |

OTHER REFERENCES

A Two Color Direct-View Receiver, RCA, November 1949.